US011241958B2

(12) United States Patent
Fohrenkamm et al.

(10) Patent No.: US 11,241,958 B2
(45) Date of Patent: Feb. 8, 2022

(54) ELECTRONIC SPEED CONTROL SYSTEM (71) Applicant: The Toro Company, Bloomington, MN (US)

(72) Inventors: Jeremy A. Fohrenkamm, River Falls, WI (US); Rebecca A. Springman, Centerville, MN (US); Kelly S. Meemken, Savage, MN (US)

(73) Assignee: The Toro Company, Bloomington, MN (US)

( * ) Notice: Subject to any disclaimer, the term of this patent is extended or adjusted under 35 U.S.C. 154(b) by 339 days.

(21) Appl. No.: 16/278,661

(22) Filed: Feb. 18, 2019

(65) Prior Publication Data
US 2019/0255944 A1 Aug. 22, 2019

Related U.S. Application Data

(60) Provisional application No. 62/631,605, filed on Feb. 16, 2018.

(51) Int. Cl.
*B60K 31/00* (2006.01)
*B60K 28/08* (2006.01)
*B60K 28/10* (2006.01)
*F02D 41/02* (2006.01)
*B60K 26/04* (2006.01)

(52) U.S. Cl.
CPC .......... *B60K 31/0058* (2013.01); *B60K 28/08* (2013.01); *B60K 28/10* (2013.01); *F02D 41/0225* (2013.01); *B60K 26/04* (2013.01); B60K 2026/043 (2013.01); B60K 2031/0091 (2013.01); F02D 2200/501 (2013.01)

(58) Field of Classification Search
CPC .... B60K 31/0058; B60K 28/08; B60K 28/10; B60K 6/48; B60K 17/28; B60K 25/00; B60K 2370/1438; B60K 26/04; B60K 2031/0091; F02D 41/0225
See application file for complete search history.

(56) References Cited

U.S. PATENT DOCUMENTS

| 4,419,729 | A | * | 12/1983 | Krieder | F02D 11/10 701/93 |
| 6,085,725 | A | * | 7/2000 | Goode | F02D 11/105 123/357 |
| 6,138,069 | A | * | 10/2000 | Ellertson | A01B 67/00 701/50 |
| 8,464,824 | B1 | * | 6/2013 | Reisenberger | B60K 28/10 180/268 |
| 8,534,397 | B2 | * | 9/2013 | Grajkowski | F02D 11/105 180/54.1 |
| 9,152,607 | B2 | * | 10/2015 | Wetterlund | B60G 9/02 |
| 9,162,573 | B2 | * | 10/2015 | Grajkowski | B63H 3/10 |
| 9,381,810 | B2 | * | 7/2016 | Nelson | F02D 11/105 |
| 10,086,698 | B2 | * | 10/2018 | Grajkowski | B60K 31/00 |
| 10,131,227 | B2 | * | 11/2018 | Johansson | B60W 30/143 |
| 10,933,744 | B2 | * | 3/2021 | Grajkowski | B60K 26/04 |
| 2005/0282682 | A1 | * | 12/2005 | Ishii | B60W 10/06 477/107 |

(Continued)

*Primary Examiner* — Luis A Martinez Borrero
(74) *Attorney, Agent, or Firm* — Inskeep IP Group, Inc.

(57) ABSTRACT

A smart governor system that intercepts and adjusts throttle commands when certain criteria are met based on vehicle operations and a user-selected transmission mode. The governor, when engaged, reduces a throttle command in order limit engine and/or ground speed.

21 Claims, 5 Drawing Sheets

(56) References Cited

U.S. PATENT DOCUMENTS

| | | | | |
|---|---|---|---|---|
| 2009/0242285 | A1* | 10/2009 | Whetstone, Jr. | B62D 51/04 180/19.2 |
| 2009/0276128 | A1* | 11/2009 | Whitney | F02D 31/001 701/54 |
| 2010/0217494 | A1* | 8/2010 | Heft | B60T 8/32 701/70 |
| 2010/0318273 | A1* | 12/2010 | Aleksic | B60K 31/042 701/98 |
| 2011/0277577 | A1* | 11/2011 | Roberge | B60W 10/06 74/473.1 |
| 2011/0297462 | A1* | 12/2011 | Grajkowski | F02D 41/021 180/54.1 |
| 2011/0297463 | A1* | 12/2011 | Grajkowski | B60W 10/06 180/54.1 |
| 2011/0301824 | A1* | 12/2011 | Nelson | B60K 31/00 701/102 |
| 2011/0301825 | A1* | 12/2011 | Grajkowski | B60K 28/10 701/102 |
| 2012/0318235 | A1* | 12/2012 | Kaiser | F02D 11/105 123/350 |
| 2014/0060953 | A1* | 3/2014 | Wetterlund | B60H 1/00407 180/233 |
| 2014/0074370 | A1* | 3/2014 | Johansson | B60W 50/0097 701/93 |
| 2015/0096819 | A1* | 4/2015 | Grajkowski | B63H 3/10 180/170 |
| 2015/0232097 | A1* | 8/2015 | Luther | B61L 3/006 701/123 |
| 2016/0368493 | A1* | 12/2016 | Driscall | B66F 9/0755 |
| 2018/0170383 | A1* | 6/2018 | Flardh | B60W 40/13 |
| 2018/0170394 | A1* | 6/2018 | Bedegi | G05D 1/0088 |
| 2018/0361853 | A1* | 12/2018 | Grajkowski | B60K 28/10 |
| 2019/0217847 | A1* | 7/2019 | Hawley | B60L 7/26 |
| 2021/0031782 | A1* | 2/2021 | Poulin | H04W 4/40 |

* cited by examiner

ELECTRONIC SPEED CONTROL SYSTEM

RELATED APPLICATIONS

This application claims benefit of and priority to U.S. Provisional Application Ser. No. 62/631,605 filed Feb. 16, 2018 entitled Electronic Speed Control System, which is hereby incorporated herein by reference in its entirety.

FIELD OF THE INVENTION

The present invention pertains to electronic control of a utility vehicle's speed using an electronic throttle control system.

BACKGROUND OF THE INVENTION

Most utility or sport recreational vehicles have a conventional transmission system in which the engine speed responds directly to a throttle command, regardless of the operating conditions. Though an experienced user may appreciate having complete control over the throttle response, there are numerous situations in which it may be desirable to limit ground speed and/or engine rotations per minute (rpm) of a utility vehicle.

For example, if the utility vehicle is being used in a setting where it is desired to limit engine noise, such as a golf course, it may be desired to set an upper limit on engine rpms. Another example may be if there is an attachment on the vehicle, such as a plow, it may be desired to prevent the vehicle from going too fast and risk damaging the plow, the vehicle, or injuring the driver.

Many vehicles have a throttle ramp, which controls the rate at which an engine accelerates. However, throttle ramps do not typically limit top speed or engine rpms. Some vehicles have a governor built in to limit top speed, but these are typically not "smart systems" that allow a user to select upper limits based on the activity and do not include a feedback loop that monitors actual ground speed.

In order to maximize the performance and utility of a vehicle in various work environments, it would be beneficial to have a governor system that adjusts a throttle command sent by a user such that the adjusted throttle command results in an engine response that fits a set of desired criteria.

SUMMARY OF THE INVENTION

The present invention includes a control system for speed compensation on a vehicle, also referred to herein as a traction system. The system may be incorporated onto a machine during production or it may be retrofitted onto existing vehicles.

One aspect of the invention provides an electronic transmission control system for a vehicle that includes a speed compensation component, a pedal command component, and a throttle actuator. The speed compensation component is, in one embodiment, an algorithm that determines a maximum allowed speed for the vehicle based on whether or not the vehicle is operating an attachment, and a position of a transmission selector; determines a machine ground speed; and calculates a governor throttle offset value by comparing the maximum allowed speed and the machine ground speed.

The pedal command component generates an electronic pedal throttle command based on a mechanical pedal position that is electronically adjusted according to a throttle ramp. The system applies the governor throttle offset to the pedal throttle command to generate a final throttle position command, which is sent to the throttle actuator.

Another aspect of the invention provides a method of governing the speed of a vehicle using an electronic speed control system that involves setting a maximum allowed ground speed based on a vehicle attachment if there is an attachment being used, or if there is not an attachment being used, setting the maximum allowed ground speed based on a position of the transmission. Next the maximum allowed ground speed is compared to a machine ground speed to determine a governor throttle offset value. Then a pedal throttle command is adjusted with the governor throttle offset value to generate a final throttle position command.

Still another aspect of the invention provides a method of calibrating an electrical zero throttle position of an electronic speed control system of a vehicle to a desired engine rpm. This method includes setting the electronic speed control system to calibration mode, which in turn commands an actuator to place a bell crank attached to a throttle cable against a mechanical stop. The mechanical stop is used as an initial zero throttle position. Next the ECU commands the actuator to slowly turn the bell crank to increase the throttle position and an engine rpm. During this time, the throttle position and the engine rpm are monitored using the machine electronic control unit (ECU). The throttle position is held when the manufacturer-recommended engine rpm is achieved, and the held throttle position is set as the calibrated electrical zero throttle position.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Generally, the present invention provides a solution to the aforementioned needs by engaging a ground speed governor to create a throttle offset if certain ground speed governor conditions are met. These conditions are determined by the position of a user-controlled, transmission selector or whether an attachment is installed on the vehicle. For each position, different maximum allowed ground speeds are implemented.

The ground speed governor continuously compares the maximum allowed ground speed against the machine's ground speed and a throttle offset is calculated. The throttle offset value is added to the throttle command received from the user, such as via a throttle pedal or lever. When a user desires to accelerate the vehicle, the user actuates a throttle mechanism such as a throttle pedal, thumb lever, twist grip, etc. For sake of clarity, the term "pedal command" or "pedal throttle command" will be used herein to denote the actuation of a throttle mechanism. As the pedal is depressed, the pedal position is converted to a throttle command, which is in turn relayed to the throttle ramp. The throttle ramp is a setting that controls the rate at which the engine speed increases, thereby controlling the behavior of the vehicle acceleration. When a non-zero throttle offset value (either a positive or negative number) is added to the pedal throttle command, a final throttle command is calculated and sent to the throttle actuator.

In order to ensure system accuracy, one embodiment of the present invention includes a calibration sequence that ensures the throttle command corresponds to the pedal command. Various factors may warrant recalibration, the most common of which is throttle cable stretch.

During normal operation, the throttle system uses an idle setting that is fast enough to maintain the engine in an idling state while slow enough to minimize engine noise and ensure the transmission does not engage.

Figure 1:
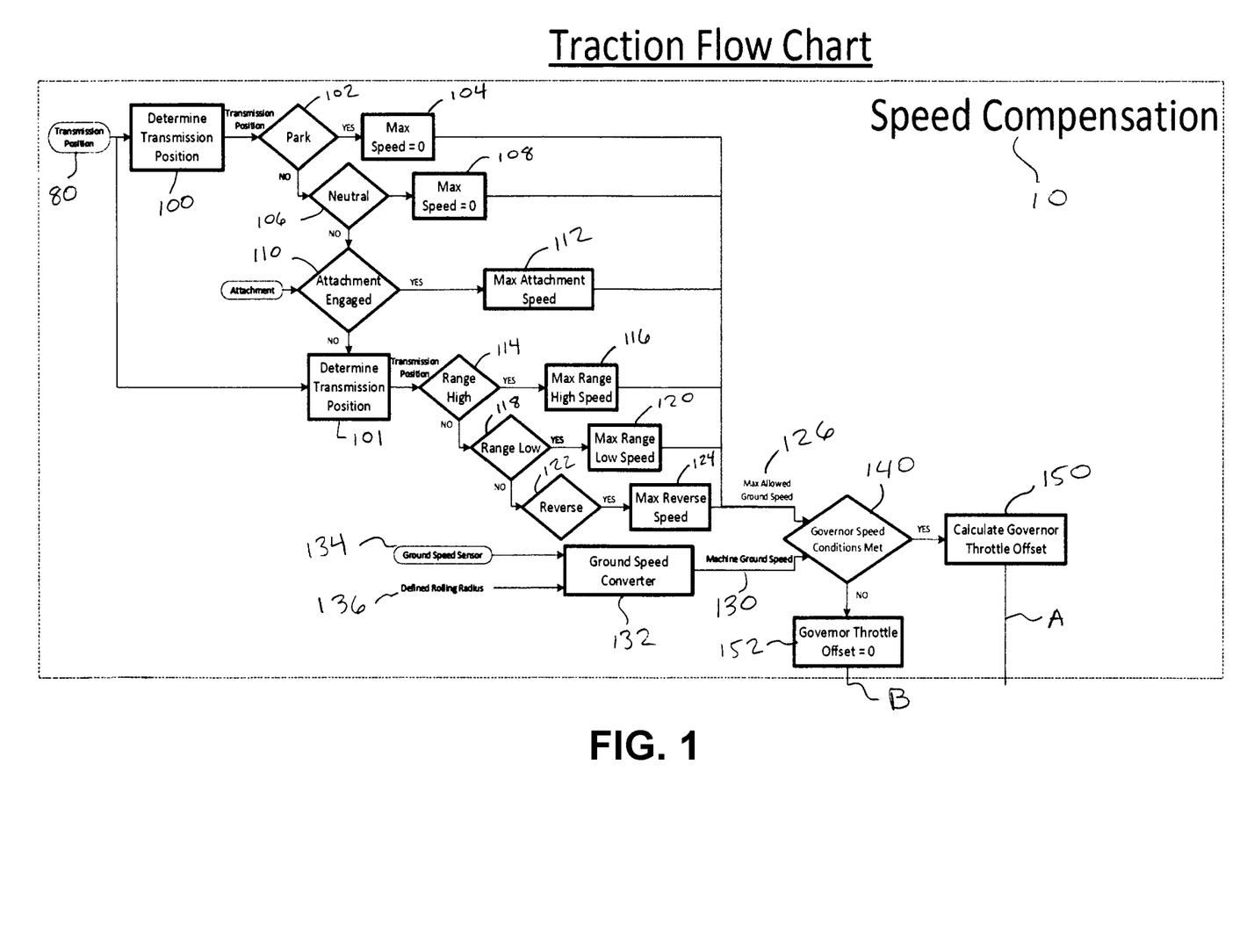
FIG. 1 is a flowchart of a speed compensation component of an embodiment of the invention.
Figure 4:
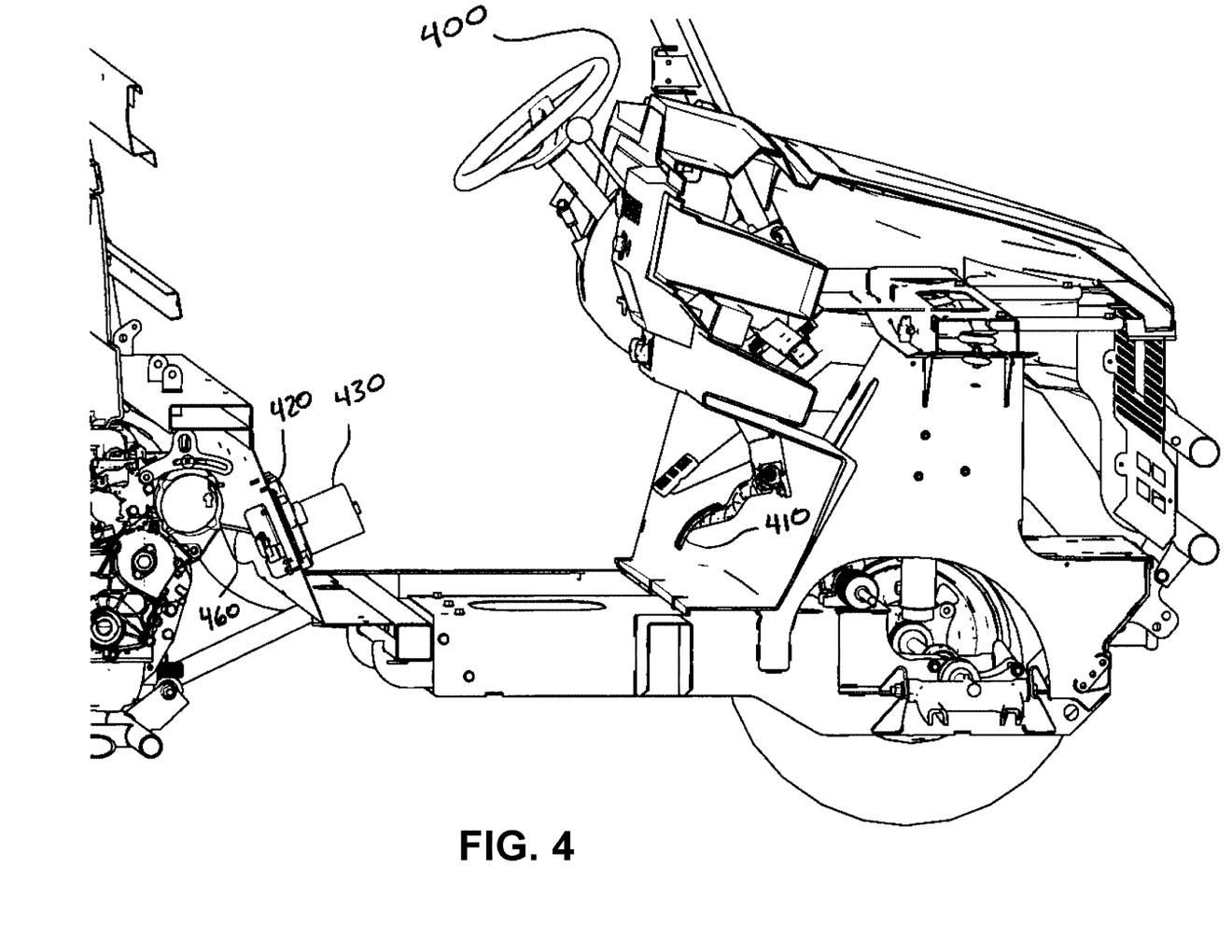
FIG. 4 is a partial perspective cutaway view of a vehicle having physical components of the invention installed thereon.
Figure 5:
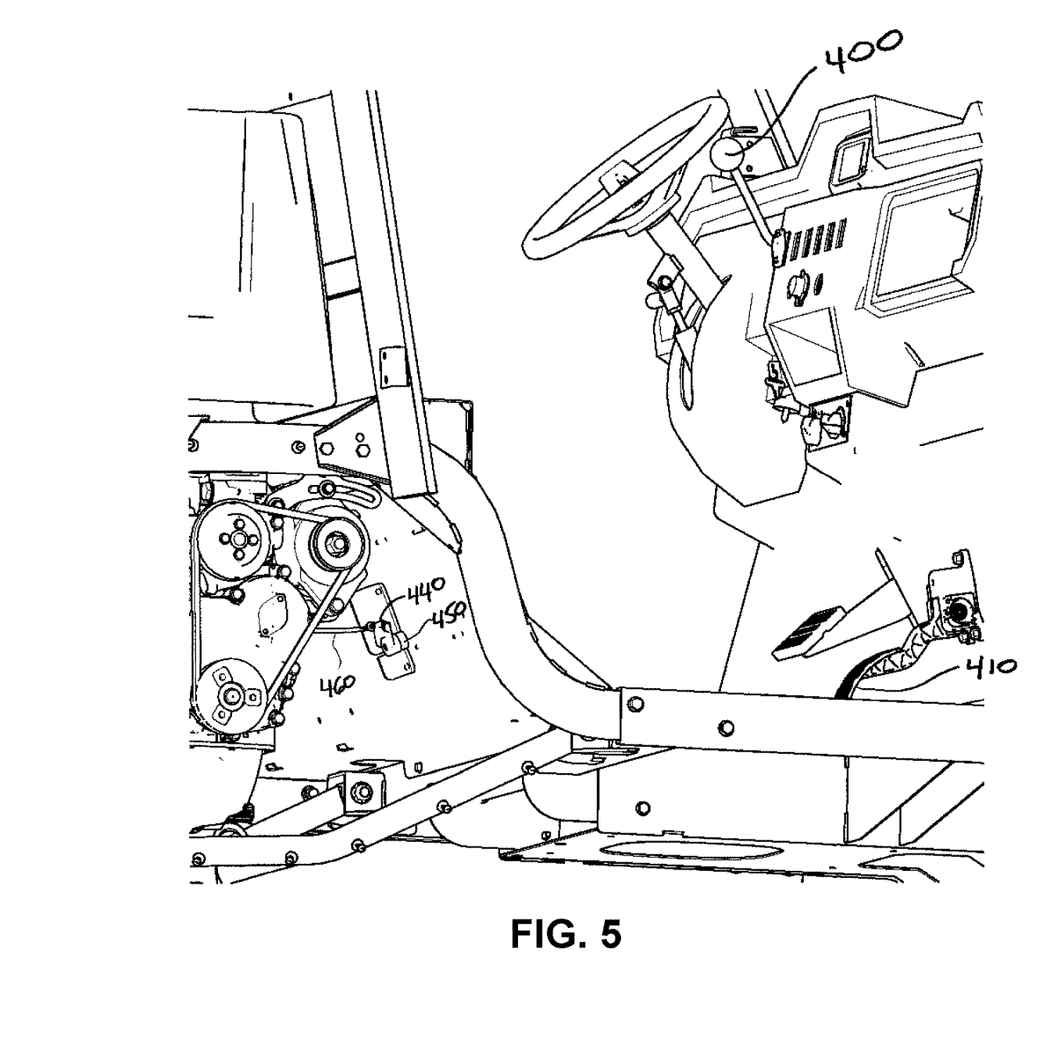
FIG. 5 is a partial perspective cutaway view of a vehicle to illustrate the arrangement of a throttle cable, actuator shaft and bell crank of an embodiment of the electronic speed control system of the invention; and, FIG. 6 is a front elevation of an embodiment of the actuator shaft and bell crank of the invention.

FIG. 1 is a flowchart of a speed compensation component 10 of an embodiment of the invention. The speed control system begins at 100 by first analyzing whether the transmission position 80 is in park or neutral. The transmission position 98 refers to the position of a transmission selector positionable by a user of the vehicle. A physical embodiment of a transmission selector 400 is shown in FIGS. 4 and 5. In at least one embodiment, the vehicle may include five different transmission selector positions. One skilled in the art will readily understand that the number of transmission selector positions may be variable, depending on the uses of the incorporating vehicle, without departing from the invention. The five positions of the vehicle transmission selector 400, used as an example herein, are Range High, Range Low, Reverse, Park, and Neutral.

If the transmission position 80 is in park at 102, or in neutral at 106, then the maximum speed is set to zero at 104 or 108, respectively. If the transmission position 80 is not in park or neutral, then at 110 it is determined whether there is an attachment 90 engaged with the vehicle.

Attachments may include limitations on the maximum speed the vehicle may travel. The determination of an attachment is made prior to further analysis of the transmission position because if the attachment has a speed limitation associated with it, that attachment speed limitation overrides speed limitations associated with the transmission selector position.

If, at 110, it is determined that an attachment is engaged, then at 112 the maximum speed for that attachment is used as input for the Maximum Allowed Ground Speed 126 to determine whether the Governor Speed Conditions are met at 140.

If, at 110, it is determined that an attachment is not engaged, then at 101, the transmission position 80 is again analyzed to determine an appropriate Max Allowed Ground Speed 120.

The control system determines at 114, whether the transmission selector is in the Range High position. If the control system determines that the selector is in the Range High position at 114, then at 116 the Max Range High Speed value (for example, 25 mph) is used as input for the Maximum Allowed Ground Speed 126 to determine whether the Governor Speed Conditions are met at 140.

If at 114 the control system determines the transmission selector is not in the Range High position, the logic of the control system next determines at 118 whether the transmission selector is in the Range Low position. If the control system determines that the selector is in the Range Low position at 118, then at 120 the Max Range Low Speed value (for example, 13 mph) is used as input for the Maximum Allowed Ground Speed 126 to determine whether the Governor Speed Conditions are met at 140.

If at 118 the control system determines the transmission selector is not in the Range Low position, the logic of the control system next determines at 122 whether the transmission selector is in the Reverse position. If the control system determines that the selector is in the Reverse position at 122, then at 124 the Max Reverse Speed value is used as input for the Maximum Allowed Ground Speed 120 to determine whether the Governor Speed Conditions are met at 140.

In order to determine whether the Governor Speed Conditions are Met at 140, the input value for Maximum Allowed Ground Speed 126 is compared against the Machine Ground Speed 130. The Machine Ground Speed 130 is a calculation made by the Ground Speed Converter 132. The Ground Speed Converter 132 gets inputs from a sensor 134 which measures wheel rotation speed, and a defined rolling radius 136. Knowing the rolling radius of the wheels, the converter 132 is able to calculate ground speed.

At 140, the conditions are met if the Machine Ground Speed 130 is greater than the Maximum Allowed Ground Speed 120, indicating a governing correction must be made, a load on the machine is not allowing the maximum speed, or the expected acceleration, at the full stroke of the pedal position for a set amount of time, or if the throttle pedal position changes drastically, allowing for a ramp down in speed rather than an abrupt stop. This is accomplished at 150 by applying a negative correction factor known as a Governor Throttle Offset 154. If the Machine Ground Speed 130 is not greater than the Maximum Allowed Ground Speed 120, then at 152, the Governor Throttle Offset 154 is set to zero. The outputs from steps 150 and 152 are designated as A and B, respectfully, in FIGS. 1 and 2 to show they are used as inputs in the Pedal Command 20 of FIG. 2.

Figure 2:
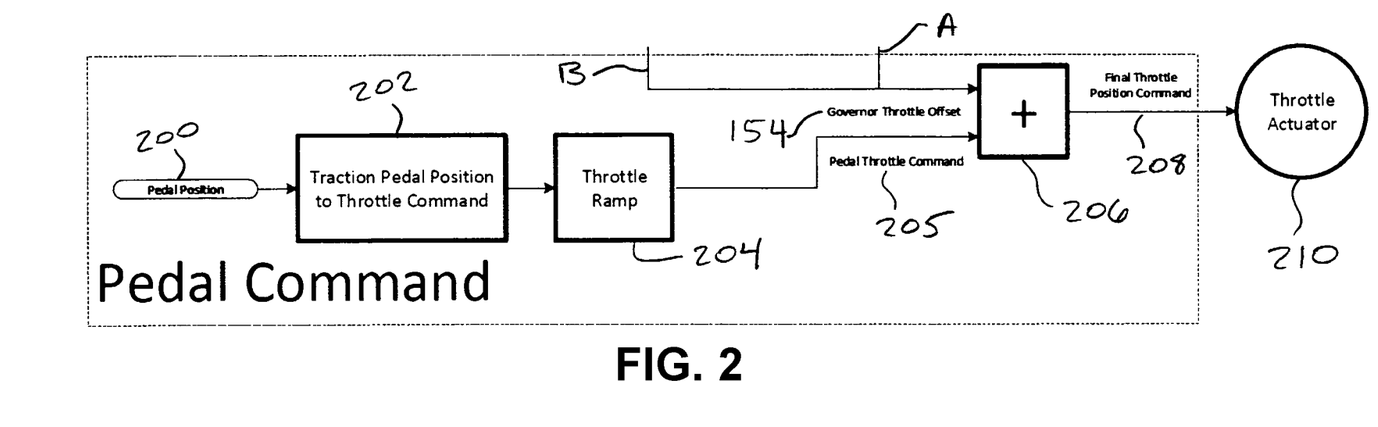
FIG. 2 is a flowchart of a pedal command component of an embodiment of the invention.

Turning now to FIG. 2, the relationship between a Pedal Command 20 and the Speed Compensation 10 is explained. The Pedal Command 20 begins with a mechanical position of the throttle actuation mechanism, in this case a pedal, at 200. Being an electronic system, the mechanical position of the pedal at 200 is converted to an electronic throttle command at 202.

Figure 6:
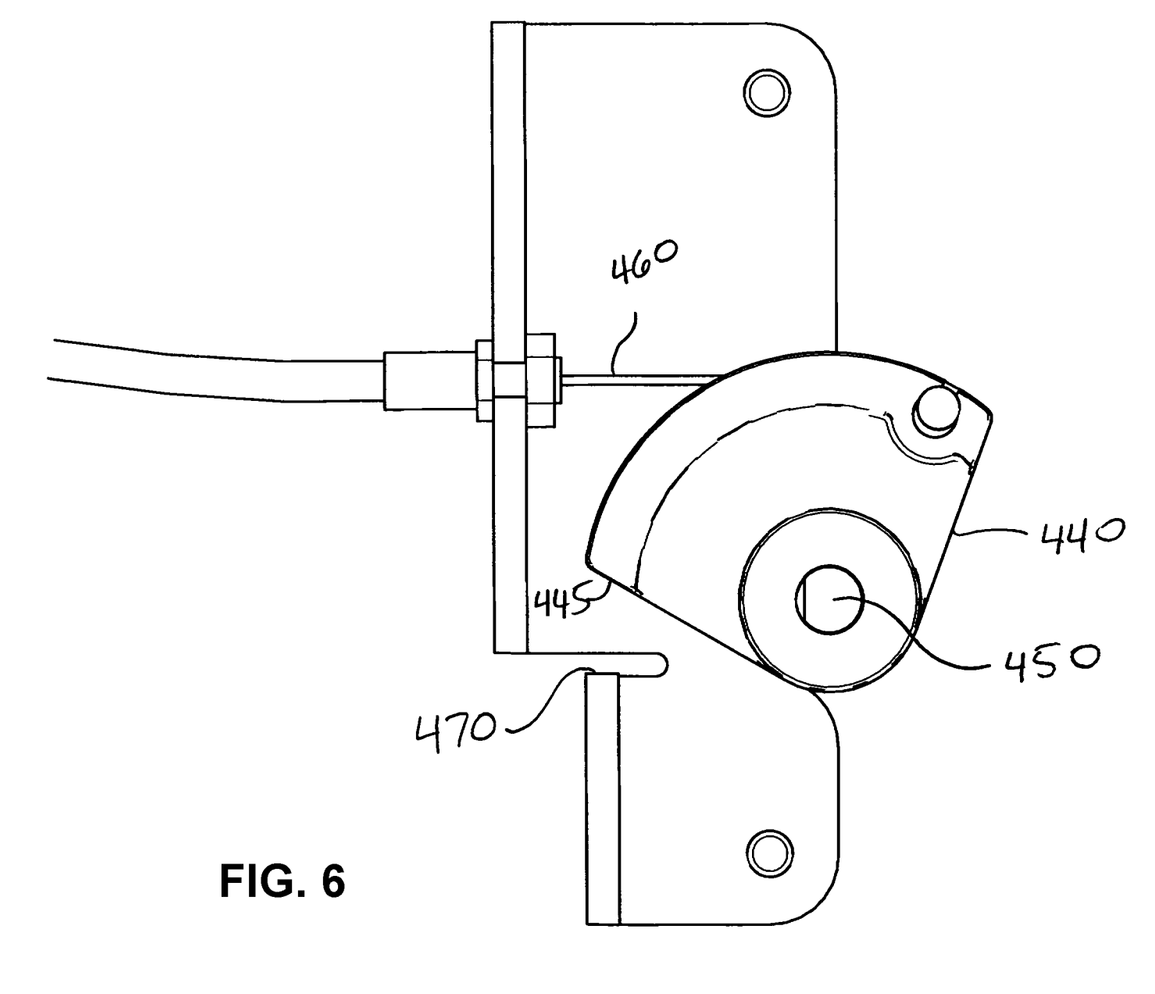

Physically, the pedal 410 is shown in FIGS. 4 and 5. Electrical signals from the pedal 410 position are measured by the ECU 420, which in turn controls the actuator 430 according the method of the invention. The actuator 430 is connected to a bell crank 440 (see FIG. 6) via an actuator shaft 450. The actuator 430 may be an electric motor, a hydraulic actuator, or the like. The bell crank 440 is connected to, and operates, the throttle cable 460.

The throttle command 202 is next relayed to the throttle ramp at 204. The throttle ramp is a setting that controls the rate at which the engine speed increases, thereby controlling the behavior of the vehicle acceleration. Thus, the throttle ramp alters the desired throttle command 205 in accordance with a desired throttle response protocol. The adjusted throttle command 205 is then sent as an input to a throttle summing computation at 206. The computation at 206 adds the adjusted throttle command 205 to the Governor Throttle Offset 154, which is either zero, a negative value or a positive value. When a non-zero throttle offset value (a negative number) is added to the pedal throttle command, a final throttle command 208 is calculated and sent to the throttle actuator at 210. Physically the throttle actuator is the actuator 430 shown in FIG. 4.

Figure 3:
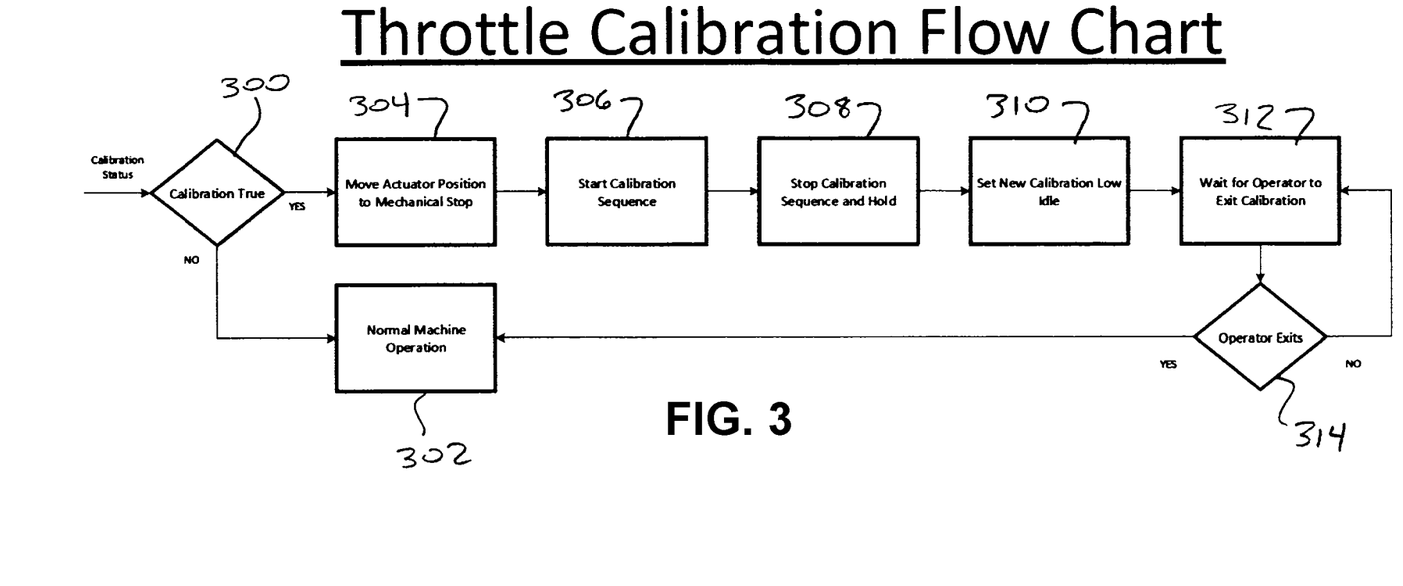
FIG. 3 is a flowchart of a throttle calibration component of an embodiment of the invention.

FIG. 3 shows a Throttle Calibration Flow Chart 30 of the invention. This calibration sequence ensures the throttle command corresponds to the pedal command. Doing so corrects any degradation in engine performance due to throttle cable stretch. During normal operation, the throttle system uses an idle setting that is fast enough to maintain the engine in an idling state while slow enough to minimize engine noise and ensure the transmission does not engage.

Beginning at 300, the system determines whether the user has elected to perform a calibration sequence via a manual calibration selector. If the selector is not in the calibration setting, normal machine operation resumes at 302. If, however, the selector has been set to calibration at 300, at 304 a bell crank 440 is physically moved to a mechanical stop. Looking at FIGS. 4-6, this is accomplished by the ECU 420 commanding the actuator 430 to rotate until the edge 445 of the bell crank 440 impinges on the stop 470. This stop 470 represents an initial zero throttle for purposes of the calibration sequence. This position thus becomes the electrical zero throttle position for the throttle actuator during the calibration sequence.

Next the calibration sequence begins at 306. From the electrical zero position, established by the mechanical stop 470, the actuator 430 slowly increases the throttle position and the engine rpm. The machine ECU 420 is monitoring the throttle position and engine RPM during this sequence.

Next, at 308, when the throttle position results in the desired engine RPM the ECU communicates to the throttle actuator 430 to stop the calibration sequence and hold the desired position. The desired engine RPM is a machine-specific determination made by the manufacturer in order to provide optimal engine response. By way of non-limiting example, for a given machine, setting the desired engine RPM to 100 RPM higher than idle may reduce or eliminate a dead band in throttle response. The optimal desired engine RPM is determined through experimentation.

Finally, at 310 the machine ECU 420 communicates a new calculated calibration position that is used by the throttle actuator 430 as the new electrical zero position. After this the system is placed in a holding pattern at 312 and 314, until the operator takes the vehicle out of calibration mode, at which point normal machine operation is resumed at 302.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An electronic speed control system for a vehicle comprising:
    an electronic control unit programmed to run:
    a speed compensation algorithm that:
        determines a maximum allowed speed for the vehicle based on a transmission configuration;
        determines a machine ground speed; and,
        calculates a governor throttle offset value by comparing the maximum allowed speed and the machine ground speed;
    a pedal command algorithm that generates an electronic pedal throttle command based on a mechanical pedal position that is electronically adjusted according to a throttle ramp; and,
    a throttle actuator;
        wherein said system applies said governor throttle offset to said electronic pedal throttle command to generate a final throttle position command, which is sent to said throttle actuator.

2. The system of claim 1 wherein said algorithm further determines whether the vehicle is operating an attachment, and if the vehicle is operating an attachment, the speed compensation algorithm sets the maximum allowed speed to a maximum allowed attachment speed.

3. The system of claim 2, wherein if the vehicle is not operating an attachment, the speed compensation algorithm sets the maximum allowed speed to a maximum speed according to the transmission configuration.

4. The system of claim 3, wherein the transmission configuration is determined by a transmission selector position, which is one of range high, range low, reverse, park and neutral.

5. The system of claim 1 further comprising a throttle-calibration algorithm activated by a calibration selector that, when activated, calibrates the throttle by setting an electrical zero throttle position to a manufacturer-recommended engine rpm that optimizes performance.

6. The system of claim 5 wherein said throttle calibration algorithm comprises an automatic sequence that when activated, moves an actuator position to a mechanical stop.

7. The system of claim 6 wherein said automatic sequence comprises:
    using the mechanical stop as an initial zero throttle position;
    increasing a present throttle position and an engine rpm with the actuator lever;
    monitoring the throttle position and the engine rpm using a machine electronic control unit (ECU);
    holding the throttle position when the manufacturer-recommended engine rpm is achieved; and,
    the ECU establishes the held throttle position as the calibrated electrical zero throttle position.

8. The system of claim 1 wherein said transmission configuration is determined by a position of a transmission selector.

9. A method of governing a speed of a vehicle electronically comprising:
    setting a maximum allowed ground speed based on a vehicle attachment if there is an attachment being used;
    setting the maximum allowed ground speed based on a position of a transmission selector if there is not an attachment being used;

comparing the maximum allowed ground speed to a machine ground speed to determine a governor throttle offset value; and, adjusting a pedal throttle command with said governor throttle offset value to generate a final throttle position command.

10. The method of claim 9 wherein setting the maximum allowed ground speed based on the position of the transmission selector if there is not an attachment being used comprises determining whether the transmission selector is in range high, range low, or reverse.

11. The method of claim 9 further comprising setting the maximum allowed ground speed to zero if the transmission selector is in park or neutral, regardless of whether there is an attachment being used.

12. The method of claim 9 wherein comparing the maximum allowed ground speed to the machine ground speed to determine the governor throttle offset value comprises setting the governor throttle offset to zero if the maximum allowed ground speed is greater than or equal to the machine ground speed.

13. The method of claim 9 wherein comparing the maximum allowed ground speed to the machine ground speed to determine the governor throttle offset value comprises calculating the machine ground speed.

14. The method of claim 13 wherein calculating the machine ground speed comprises calculating a machine ground speed based on wheel speed and wheel rolling radius.

15. The method of claim 9 further comprising determining whether the vehicle is in calibration mode.

16. The method of claim 15 further comprising actuating an automatic calibration sequence if it is determined that the vehicle is in calibration mode.

17. The method of claim 16 wherein actuating the automatic calibration sequence comprises:

using the mechanical stop as an initial zero throttle position;

increasing a throttle position and an engine rpm with the actuator lever;

monitoring the throttle position and the engine rpm using a machine electronic control unit (ECU);

holding the throttle position when the manufacturer-recommended engine rpm is achieved; and, establishing the held throttle position as the calibrated electrical zero throttle position.

18. The method of claim 9 wherein the pedal throttle command comprises an electronic pedal throttle command based on a mechanical pedal position that is electronically adjusted according to a throttle ramp.

19. A method of calibrating an electrical zero throttle position of an electronic speed control system of a vehicle to a desired engine rpm comprising:

setting the electronic speed control system to calibration mode;

placing an actuator lever against a mechanical stop;

using the mechanical stop as an initial zero throttle position;

increasing a throttle position and an engine rpm with the actuator lever;

monitoring the throttle position and the engine rpm using a machine electronic control unit (ECU);

holding the throttle position when a manufacturer-recommended engine rpm is achieved; and, establishing the held throttle position as the calibrated electrical zero throttle position.

20. The method of claim 19 wherein the desired engine rpm comprises a predetermined engine rpm established by a manufacturer of the vehicle that optimizes engine performance.

21. The method of claim 19 wherein holding the throttle position continues as long as the electronic speed control system is set to calibration mode.

* * * * *

UNITED STATES PATENT AND TRADEMARK OFFICE
CERTIFICATE OF CORRECTION

PATENT NO. : 11,241,958 B2
APPLICATION NO. : 16/278661
DATED : February 8, 2022
INVENTOR(S) : Jeremy A. Fohrenkamm, Rebecca A. Springman and Kelly S. Meemken Page 1 of 1

It is certified that error appears in the above-identified patent and that said Letters Patent is hereby corrected as shown below:

On the Title Page

At item (72), please add the following inventor: --Jamie Larson, Bloomington, MN (US)--.

Signed and Sealed this
Twenty-fifth Day of July, 2023

Katherine Kelly Vidal
*Director of the United States Patent and Trademark Office*